United States Patent [19]

Tanahashi

[11] Patent Number: 4,851,982
[45] Date of Patent: Jul. 25, 1989

[54] APPARATUS FOR CONTROLLING AN A.C. POWERED ELEVATOR

[75] Inventor: Tooru Tanahashi, Inazawa, Japan

[73] Assignee: Mitsubishi Denki Kabushiki Kaisha, Tokyo, Japan

[21] Appl. No.: 215,022

[22] Filed: Jul. 5, 1988

[30] Foreign Application Priority Data

Jul. 6, 1987 [JP] Japan .................. 62-168136

[51] Int. Cl.$^4$ ........................... H02M 5/458
[52] U.S. Cl. .................... 363/37; 363/132; 187/116; 187/119; 318/802
[58] Field of Search ............ 363/35, 37, 98, 132; 187/112, 116, 119; 318/799, 800, 801, 802

[56] References Cited

U.S. PATENT DOCUMENTS

| | | | |
|---|---|---|---|
| 4,546,422 | 10/1985 | Okado | 363/132 |
| 4,615,000 | 9/1986 | Fujii et al. | 363/98 |
| 4,624,343 | 11/1986 | Tanahashi et al. | 187/29 R |
| 4,629,035 | 12/1986 | Tanahashi et al. | 187/119 |
| 4,640,389 | 2/1987 | Kamaike | 187/119 |
| 4,667,776 | 5/1987 | Nomura | 187/112 |
| 4,681,191 | 7/1987 | Ikejima | 187/119 |
| 4,713,595 | 12/1987 | Yonemoto | 318/759 |
| 4,719,995 | 1/1988 | Ikejima | 187/119 |
| 4,742,892 | 5/1988 | Iwata | 187/116 |

Primary Examiner—Peter S. Wong
Attorney, Agent, or Firm—Leydig, Voit & Mayer

[57] ABSTRACT

An apparatus for controlling an alternating current (A.C.) powered elevator includes a converter for converting A.C. power from A.C. power sources into direct current (D.C.) power and an inverter for converting the D.C. power into A.C. power of variable voltage and variable frequency. The converted A.C. power drives an induction motor to operate an elevator cage. The apparatus calculates a current command value from a speed command value and the speed of the motor and compares the current command value with the output current of the inverter. The apparatus further includes a conversion switch which produces an exciting current component switching command when operated and computing means for receiving the speed command value, a speed signal, and the exciting current component switching command and for calculating the current command value.

6 Claims, 5 Drawing Sheets

4,851,982

APPARATUS FOR CONTROLLING AN A.C. POWERED ELEVATOR

BACKGROUND OF THE INVENTION

The present invention relates to an apparatus for controlling an elevator which employs an induction motor driven by an inverter.

FIG. 8 is a circuit diagram showing an apparatus for controlling a prior-art A.C. powered elevator disclosed, for example, in Japanese Patent Application Laid-open No. 62-16994.

In FIG. 8, numeral 1 designates three-phase A.C power sources, numeral 2 designates capacitors connected to the A.C. power sources 1, numeral 3 designates converters consisting of transistors 3A to 3F and diodes $3a$ to $3f$ connected to the A.C. power sources 1, numeral 4 designates a reactor inserted to the D.C. side of the converter 3, numeral 5 designates an inverter consisting of transistors 5A to 5F and diodes $5a$ to $5f$ connected to the D.C. side of the converter 3 through the reactor 4, numeral 6 designates capacitors connected to the A.C. side of the inverter 5, numeral 7 designates a hoisting induction motor connected to the A.C. side of the inverter 5, numeral 8 designates a converter connected to the A.C. power sources 1 for an emergency stopping unit catching test (hereinafter referred to "a catching test"), numeral 9 designates a reactor connected to the D.C. side of the converter 8 for a catching test, and numeral 10 designates an inverter connected to the D.C. side of the converter 8 through the reactor 9 and connected at the A.C side to the motor 7 for a catching test.

The prior-art apparatus for controlling the A.C. powered elevator is constructed as described above, and when the elevator is operated in a normal mode, A.C. power from the A.C. power sources 1 is converted to D.C. power by the capacitors 2 and the converter 3, smoothed by the reactor 4, and converted to the A.C. power of variable voltage and variable frequency by the inverter 5 to drive the motor 7. The capacitors 6 serve to reduce the ripples of the output current of the inverter 5.

At the time of catching test for inspecting the performance of the emergency stopping unit of a safety device for an elevator, the emergency stopping unit installed in an elevator cage is operated to catch guide rails, and the motor 7 is rotated to move the cage downward. Since the cage is stopped at this time, a drive sheave tends to feed the main cable to the cage side, and finally idles with respect to the main cable. This tests whether the cage slips downward even in this state. At this time, the motor 7 needs to produce a torque of 300 to 400% of the normal elevating torque so as to overcome the frictional force between the sheave and the main cable. Therefore, at the time of catching test, the converter 8, the reactor 9 and the inverter 10 for the catching test are employed to operate in parallel with the converter 3, the reactor 4 and the inverter 5 for the normal elevation.

In the prior-art apparatus for controlling the A.C. powered elevator as described above, the converter 8, the reactor 9 and the inverter 10 are exclusively used for producing high torque at the time of catching test. Therefore, the apparatus has drawback that the arrangement is expensive.

SUMMARY OF THE INVENTION

The present invention has been made in view of the disadvantage described above, and has for its object to provide an apparatus for controlling an A.C. powered elevator which can produce necessary high torque without using a converter, a reactor and an inverter exclusively used at the time of catching test.

Another object of the present invention is to provide an apparatus for controlling an A.C. powered elevator which can be automatically controlled to generate high torque.

The apparatus for controlling the A.C. powered elevator according to the present invention controls the current of the inverter and increases an exciting current component of a current command value when a conversion switch is operated at the necessary time.

According to another aspect of the apparatus for controlling the A.C. powered elevator of the present invention, the current command value is maintained constant and the slip frequency of the current command value is reduced when the speed of the motor becomes below a predetermined value and the torque command value becomes above a predetermined value in the above-described apparatus.

Since the exciting current component of the output current of the inverter is increased at the necessary time of the catching test according to the present invention, the torque generated from the motor is large even if the primary current of the motor is small.

In another aspect of the present invention, the current command value is maintained constant and the slip frequency is reduced. Therefore, even if the output current of the inverter is suppressed to below a predetermined value, the torque generated from the motor is large.

BRIEF DESCRIPTION OF THE DRAWINGS

In the drawings, the same symbols indicate the same or corresponding parts.

DESCRIPTION OF THE PREFERRED EMBODIMENTS

Figure 1:
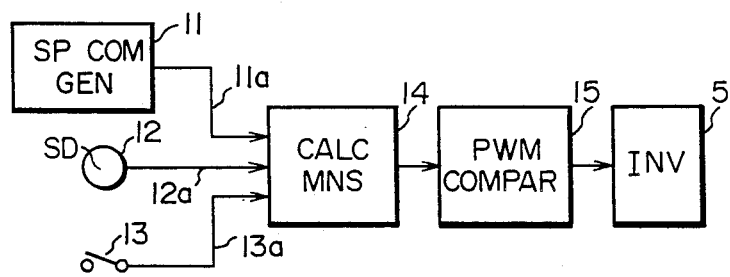
FIG. 1 is a schematic block diagram of the entire construction of an apparatus for controlling an A.C. powered elevator according to an embodiment of the present invention.
Figure 2:
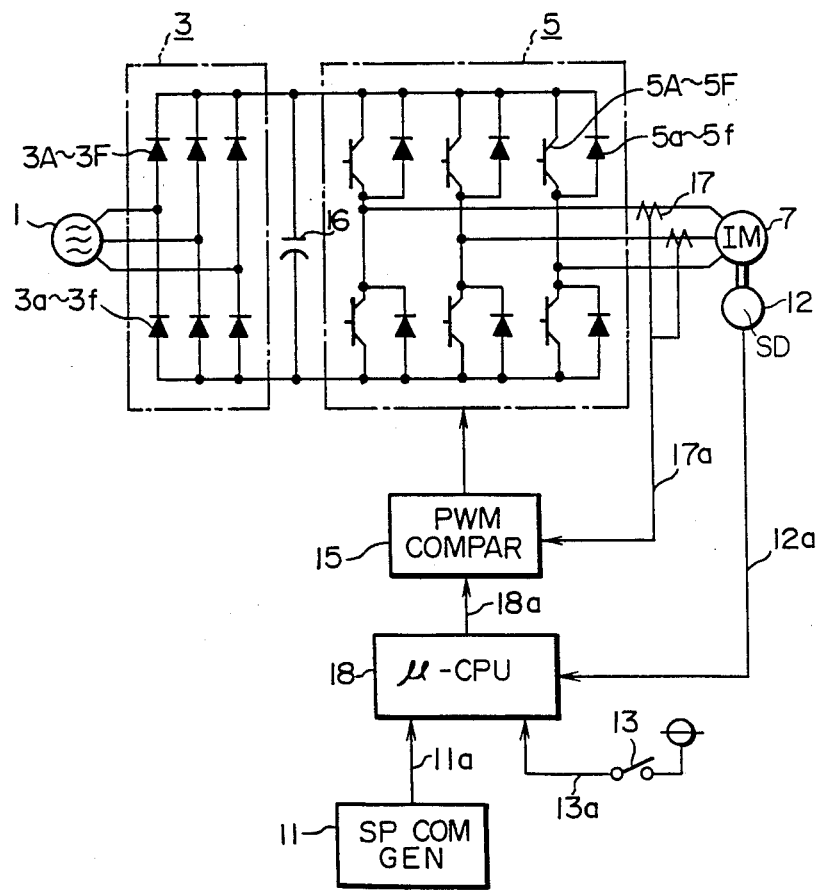
FIG. 2 is a circuit diagram according to the embodiment of the invention.
Figure 3:
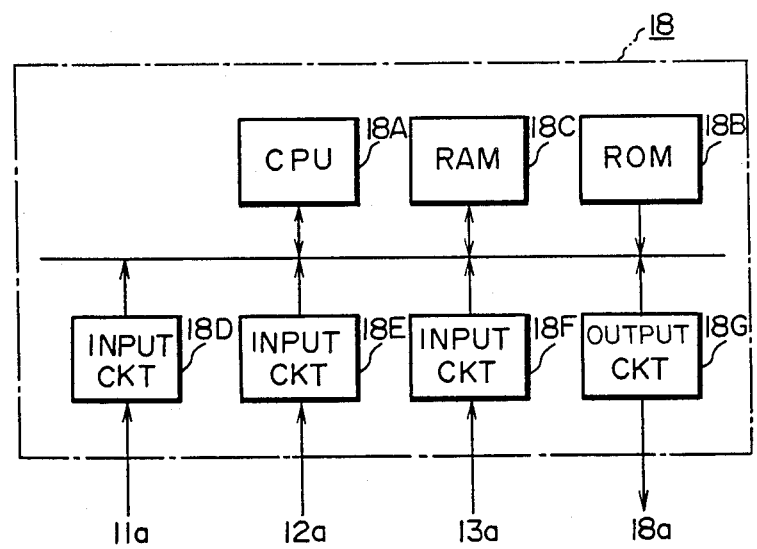
FIG. 3 is a block circuit diagram of a microcomputer of FIG. 2.
Figure 4:
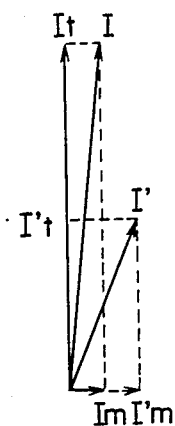
FIG. 4 is a diagram of a current vector.

FIGS. 1 to 5 show an embodiment of the present invention, and FIG. 1 shows the entire construction of an apparatus for controlling an A.C. powered elevator of the invention, FIG. 2 is a circuit diagram of the embodiment, FIG. 3 is a block circuit diagram of a microcomputer, and FIG. 4 is a diagram of a current vector, wherein the same reference numerals as those in the prior-art apparatus indicate the same or equivalent parts.

As apparent from FIG. 1, the embodiment comprises computing means 14 which inputs a speed command value 11a from a speed command generator 11, a speed signal 12a from a speed detector 12 for detecting the speed of an electric motor 7, and an exciting current component switching command 13a from a conversion switch 13. The embodiment is constructed to calculate the current command value by the computing means 14, to increase the exciting current component of the current command value when the conversion command 13a is inputted, to control the inverter 5 through a PWM (pulsewidth-modulation) comparator 15 and to increase the exciting current component of the output current of the inverter 5.

In FIGS. 2 and 3, numeral 16 designates a smoothing capacitor connected to the D.C. side of the converter 3 for smoothing a D.C. voltage, numeral 17 designates a current detector for detecting the output current of the inverter 5 to generate a current signal 17a, numeral 18 designates a microcomputer having a CPU 18A, an ROM 18B, an RAM 18C, input circuits 18D to 18F and an output circuit 18G. A speed command generator 11, a speed detector 12 and a conversion switch 13 are respectively connected to the input circuits 18D to 18F, and the PWM comparator 15 is connected to the output circuit 18G.

In the apparatus for controlling the elevator constructed as described above, the microcomputer 18 compares the speed command value 11a with the speed signal 12a, and calculates the torque command value. The microcomputer 18 calculates the current command value 18a from the torque command value, and sends it to the PWM comparator 15. The PWM comparator 15 compares the current command value 18a with the current signal 17a to apply a pulse-width modulated output to the inverter 5. The inverter 5 thereby supplies a pulse-width modulated output current to the motor 7 to control the speed thereof, thereby elevating an elevator cage (not shown).

The torque Te generated by the motor 7 is indicated by the following equation.

$$Te = K \cdot Im \cdot It \quad (1)$$

wherein:
K: a proportional constant determined by the motor 7,
Im: an exciting current of the motor 7,
It: a torque current of the motor 7.

When the torque command value is represented by Te*, the torque current It is calculated from the equation (1) to It=Te*/K.Im. Therefore, the current value 18a I* is calculated as below.

$$I^* = Im + It \quad (2)$$

and its effective value becomes as below, and outputted to the PWM comparator 15.

$$|I| = \sqrt{Im^2 + (Te/K \cdot Im)^2} \quad (3)$$

On the other hand, the conversion switch 13 is closed at the time of catching test. When the conversion command 13a is inputted, the calculation to increase the exciting current component of the current command value 18 is executed as below.

$$|I'| = \sqrt{Im'^2 + (Te/K' \cdot Im')^2} \quad (4)$$

The relationship among the exciting currents Im, Im', the torque currents It, It' and the output current I of the inverter 5 is as shown in FIG. 4. Thus, the torque currents It, It' are much larger than the exciting currents Im, Im', and the phases are displaced at 90° from each other. Therefore, the equations (3) and (4) are represented as below.

$$|I| \approx = Te/K \cdot Im \quad (5)$$

$$|I'| \approx = Te/K' \cdot Im' \quad (6)$$

In order to reduce a noise in the motor 7, the motor 7 is designed to reduce its magnetic flux, and its magnetic flux density can be raised by increasing its exciting current. Therefore, it can be expected that the constants of the motor 7 due to the saturation of the magnetic flux is small. As a result, when the equations (5) and (6) are compared, it becomes as below.

$$|I'| < |I|$$

Thus, the current which flows to the inverter 5 is reduced to obtain a high torque necessary at the time of catching test.

Figure 5:
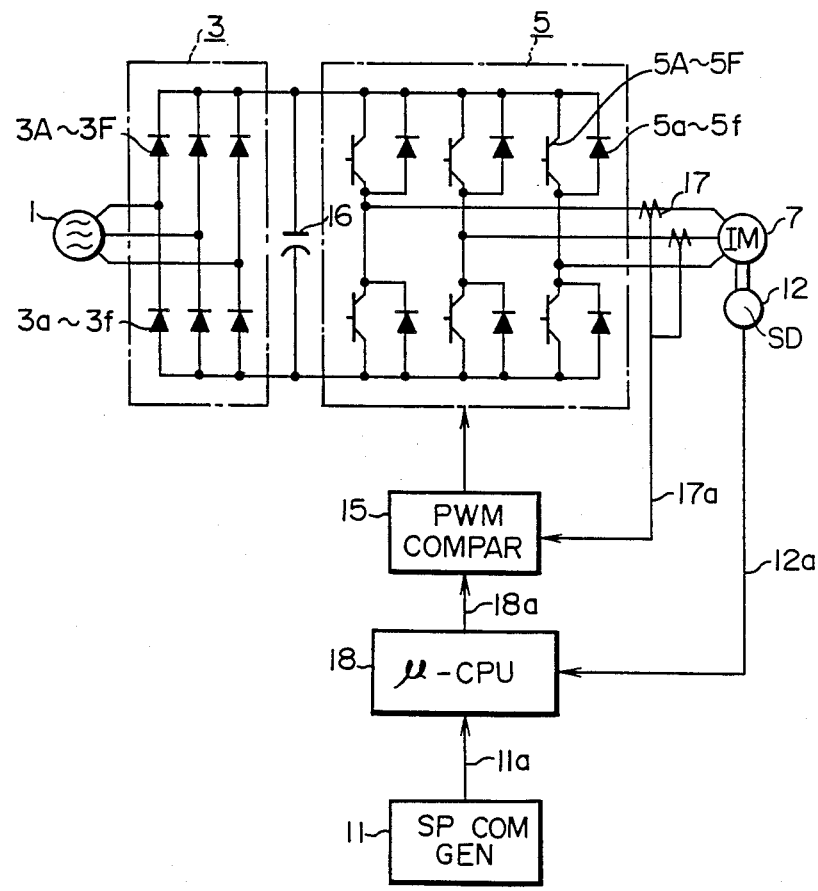
FIG. 5 is a schematic block circuit diagram of another embodiment of the present invention.
Figure 6:
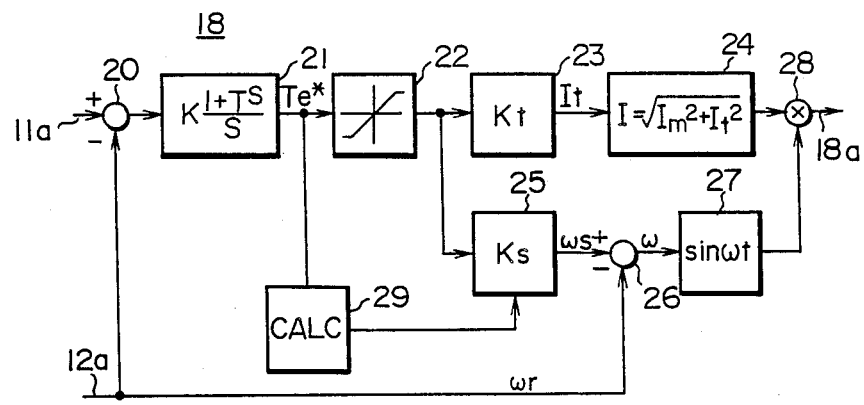
FIG. 6 is a block diagram of a control calculation of a microcomputer of FIG. 5.
Figure 7:
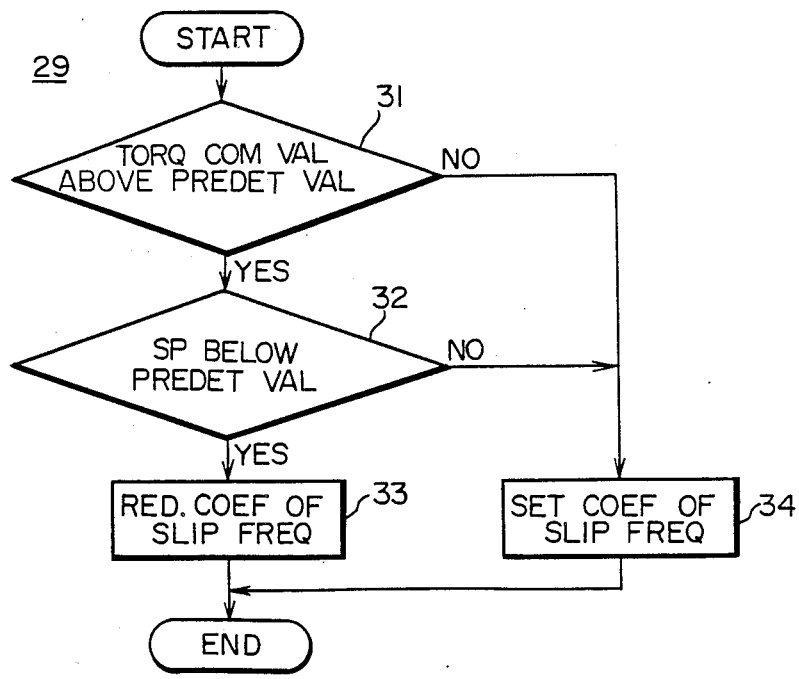
FIG. 7 is a flow chart of a calculator 29 of FIG. 6.
Figure 8:
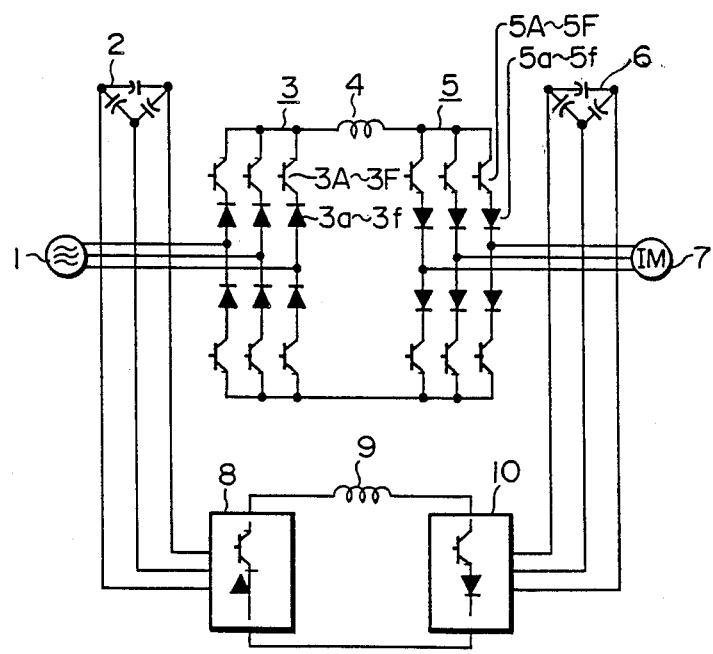
FIG. 8 is a circuit diagram showing a prior-art apparatus for controlling an A.C. powered elevator.

FIGS. 5 to 7 show another embodiment of the present invention. FIG. 5 is a schematic circuit diagram of the embodiment, FIG. 6 is a block diagram of the control calculation of a microcomputer 18, and FIG. 7 is a flow chart of a calculator 29.

FIG. 5 is similar to FIG. 2 except that the conversion switch 13 is not provided.

As shown in FIG. 6, the speed command value 11a and the speed signal 12a are added by an adder 20, and the sum is multiplied by a transfer function $K \cdot 1 + T^s/S$ (wherein K is a coefficient, T is a time constant and S is an operator) by a calculator 21 to produce a torque command value Te*. The torque command value Te* is set at the upper and lower limiting values by a calculator 22, and multiplied by a coefficient Kt by a calculator 23 to produce a torque current It. Then, $|I| = \sqrt{Im^2 + It^2}$ is obtained by a calculator 24 to calculate a current command value. On the other hand, the torque command value is multiplied by the coefficient Ks by a calculator 25 to obtain a slip frequency $\omega_s$. A speed $\omega_r$ is added to the slip frequency $\omega_s$ by an adder 26 to produce the output frequency $\omega$ of the inverter 5. A calculator 27 obtains the sine value $\sin \omega t$ of the angle $\omega t$ obtained by integrating the output frequency $\omega$ in terms of the time t, a multiplier 28 multiplies the current I obtained by the calculator 24 by the sine value $\sin \omega t$ obtained by the calculator 27 to obtain the momentary value of the current to become a current command 18a to the PWM comparator 15.

In the catching test, even if the speed command value 11a is outputted, if the torque of the motor 7 is insufficient, the torque command value Te* obtained by the calculator 21 exceeds the limiting value set by the calculator 22. At this time, the calculator 29 calculates it, which is shown in FIG. 7.

Whether the torque command value Te* exceeds the limiting value is judged in step 31. In this case, since the torque command value Te* falls within the limiting value, the flow advances to step 32 to judge whether the speed is below a predetermined value. When the motor 7 is not rotated, the speed is below the predetermined value. Thus, the flow advances to step 33 to reduce the coefficient Ks of the slip frequency $\omega_s$. By using the reduced coefficient Ks, the calculation in FIG. 6 is executed to output the current command value 18a. The current command value 18a is suppressed to a predetermined value by the calculator 22. Since the coefficient Ks is reduced, the slip frequency $\omega_s$ becomes small. At this time, the relationship between the exciting current component Im of the current flowing to the motor 7 and the torque current component It becomes as below.

$$It = \frac{L_2}{R_2} Im \cdot \omega_s \tag{7}$$

wherein
$L_2$: secondary inductance of the motor 7,
$R_2$: secondary resistance of the motor 7.
Therefore, it becomes as below.

$$|I| = \sqrt{Im^2 + It^2} \tag{8}$$
$$= Im \sqrt{1 + \left(\frac{L_2}{R_2} \omega_s\right)^2}$$
$$= \text{constant}$$

Thus, it becomes as below $Im \alpha 1/\omega_s$

When the slip frequency $\omega_s$ becomes small, the exciting current Im of the motor 7 increases, and the internal magnetic flux increases. From the equations (1) and (7), $Te \alpha Im^2 \cdot \omega_s$ is obtained, the torque Te becomes as below.

$Te \alpha 1/\omega_s$

Thus, the generated torque becomes large. Therefore, the high torque necessary for the catching test can be generated while the current flowing to the inverter 5 is suppressed to below a predetermined value.

When the torque command value Te* is below the predetermined value in step 31 in FIG. 7 or the speed exceeds a predetermined value, the flow advances to step 34, and the coefficient Ks of the slip frequency $\omega_s$ remains at a predetermined value.

According to the present invention as described above, the exciting current component of the current command value is, when the conversion switch is operated at the necessary time, increased. Therefore, the high torque necessary for the motor can be generated even if the converter, the reactor and the inverter exclusively used for the catching test are not employed to reduce the size and expense of the apparatus.

According to another aspect of the present invention, the current command value is maintained constant, and the slip frequency of the current command value is reduced if the speed of the motor is below the predetermined value and the torque command value becomes above the predetermined value, the above-mentioned calculation is automatically performed to be able to omit the conversion switch.

What is claimed is:

1. An apparatus for controlling an alternating current (A.C.) powered elevator comprising:
    a converter connected to receive A.C. power from an A.C. power source and to convert the A.C. power into direct current (D.C.) power;
    an inverter connected to receive the D.C. power from the converter and to convert the D.C. power to A.C. power of variable voltage and variable frequency, the A.C. power including output current;
    an induction motor connected to receive the A.C. power of variable voltage and variable frequency and to operate an elevator cage;
    a speed detector connected to detect a speed of the induction motor and to produce a speed signal indicative of the motor speed;
    means for generating a speed command value;
    a conversion switch which produces an exciting current component switching command when operated;
    computing means for receiving the speed signal, the speed command value, and the exciting current component switching command and for calculating a current command value having an exciting current component and a torque current component, the exciting current component being greater when the conversion switch is operated than when the conversion switch is not operated;
    a current detector connected to detect the output current of the inverter and to produce a current signal indicative of the detected current; and
    means for comparing the current command value with the current signal to produce a result and for applying the result to the inverter.

2. An apparatus for controlling an A.C. powered elevator according to claim 1 wherein the value of the output current of said inverter is smaller before said conversion switch is operated than that after said conversion switch is operated.

3. An apparatus for controlling an A.C. powered elevator according to claim 2 wherein the means for comparing the current command value with the output current of said inverter includes a pulse-width-modulation comparator, which controls said inverter.

4. An apparatus for controlling an A.C. powered elevator according to claim 1 wherein the means for comparing the current command value with the output current of said inverter includes a pulse-width-modulation comparator, which controls said inverter.

5. An apparatus for controlling an alternating current (A.C.) powered elevator comprising:
    a converter connected to receive A.C. power from an A.C. power source and to convert the A.C. power into direct current (D.C.) power;
    an inverter connected to receive the D.C. power from the converter and to convert the D.C. power to A.C. power of variable voltage and variable frequency, the A.C. power including output current;
    an induction motor connected to receive the A.C. power of variable voltage and variable frequency and to operate an elevator cage;
    a speed detector connected to detect a speed of the induction motor and to produce a speed signal indicative of the motor speed;
    means for generating a speed command value;
    first computing means for receiving the speed signal and the speed command value, for calculating a current command value having a slip frequency, and for maintaining said current command value constant; and second computing means for reducing the slip frequency of said current command value when the speed of said motor becomes below a predetermined value and said torque command value becomes above a predetermined value.

6. An apparatus for controlling an A.C. powered elevator according to claim 5 wherein the means for comparing the current command value with the output current of said inverter includes a pulse-width-modulation comparator, which controls said inverter.

* * * * *